United States Patent [19]
Lee

[11] Patent Number: 5,657,133
[45] Date of Patent: Aug. 12, 1997

[54] METHOD AND DEVICE FOR SAVING TONER AND PREVENTING CONTAMINATION IN AN IMAGE FORMING APPARATUS

[75] Inventor: Young-Seob Lee, Seoul, Rep. of Korea

[73] Assignee: SamSung Electronics Co., Ltd., Suwon, Rep. of Korea

[21] Appl. No.: 535,874

[22] Filed: Sep. 28, 1995

[30] Foreign Application Priority Data

Oct. 7, 1994 [KR] Rep. of Korea .................. 1994-25701

[51] Int. Cl.$^6$ .......................... H04N 1/23; H04N 1/29; H04N 1/40; G03G 21/00
[52] U.S. Cl. .................... 358/296; 358/300; 358/449; 358/496; 358/498; 399/187; 399/376
[58] Field of Search ...................... 358/296, 300, 358/434, 443, 447, 448, 449, 453, 464, 468, 471, 474, 486, 488, 494, 496, 498; 399/45, 151, 156, 160, 182, 183, 187, 365, 376

[56] References Cited

U.S. PATENT DOCUMENTS

| | | | |
|---|---|---|---|
| 3,597,075 | 8/1971 | Kobayashi | 355/27 |
| 3,751,155 | 8/1973 | Liechty | 355/3 |
| 3,787,689 | 1/1974 | Fidelman . | |
| 4,607,945 | 8/1986 | Ide et al. | 355/14 R |
| 4,672,465 | 6/1987 | Ono | 358/296 |
| 4,733,269 | 3/1988 | Kasahara et al. . | |
| 4,839,695 | 6/1989 | Yamamoto et al. | 355/218 |
| 4,924,324 | 5/1990 | Takaoka | 358/468 |
| 4,945,374 | 7/1990 | Yamamoto et al. | 355/27 X |
| 4,974,024 | 11/1990 | Bares et al. | 355/246 |
| 5,008,709 | 4/1991 | Shinada et al. | 355/309 |
| 5,040,078 | 8/1991 | Yahara | 358/448 |
| 5,041,878 | 8/1991 | Takai et al. . | |
| 5,103,260 | 4/1992 | Tompkins et al. . | |
| 5,121,169 | 6/1992 | Kawabata | 355/311 |
| 5,148,221 | 9/1992 | Gokita . | |
| 5,198,853 | 3/1993 | Ichihara et al. | 355/244 |
| 5,202,769 | 4/1993 | Suzuki | 358/300 |
| 5,222,722 | 6/1993 | Kamano | 271/9 |
| 5,250,988 | 10/1993 | Matsuura et al. . | |
| 5,296,896 | 3/1994 | Nishiyama et al. | 355/208 |
| 5,315,352 | 5/1994 | Nakane et al. | 355/246 |
| 5,327,196 | 7/1994 | Kato et al. . | |
| 5,329,339 | 7/1994 | Sakamoto et al. | 355/246 |
| 5,331,384 | 7/1994 | Otsuka . | |
| 5,355,200 | 10/1994 | Ohba et al. | 355/246 |
| 5,418,603 | 5/1995 | Kusumoto et al. . | |

*Primary Examiner*—Eric Frahm
*Attorney, Agent, or Firm*—Robert E. Bushnell, Esq.

[57] ABSTRACT

Toner consumption and contamination in an image forming apparatus can be prevented with a device and method for presetting the paper size to be used in a manual paper feed mode and preventing printing in a region beyond the preset paper size. The device includes a paper width sensing unit that is adjusted by a user in accordance with the width of the paper. A control unit reads a value corresponding to the paper width and generates a control signal indicative of the width of the paper. An image forming unit enables formation of an image only within the range corresponding to the width of the paper.

17 Claims, 4 Drawing Sheets

METHOD AND DEVICE FOR SAVING TONER AND PREVENTING CONTAMINATION IN AN IMAGE FORMING APPARATUS

CROSS REFERENCE TO RELATED APPLICATIONS

This application makes reference to, incorporates the same herein, and claims all benefits accruing under 35 U.S.C. §119 from an application for *Method And Device For Saving Toner And Preventing Contamination In An Image Forming Apparatus* earlier filed in the Korean Industrial Property Office on 7 Oct. 1994 and there assigned Ser. No. 25701/1994.

BACKGROUND OF THE INVENTION

The present invention relates to a device and method for minimizing toner consumption and preventing toner contamination in an image forming apparatus, and more particularly to a device and a method for allowing a user to select a preset paper size to be used in a manual paper feed mode and preventing printing in areas outside the preset range, thereby minimizing the toner consumption and preventing toner contamination in an image forming apparatus.

With an image forming apparatus, it is typical for a user to select sheets of paper that are suitable for use in a paper feed device (e.g., a paper cassette) of the apparatus. In these cases, a controller often detects the size of the paper, and image formation is performed in accordance with the detected size of the paper. An electrostatic latent image forming unit enables formation of an electrostatic latent image on an outer surface of a photosensitive dram in accordance with the size of the paper.

In general, when using paper in an image forming apparatus having a size that is other than a standard size, such as A4, Legal, or Letter, a manual paper feed device is used. This type of device is disclosed in U.S. Pat. No. 5,222,722 issued to Kamano on 29 Jun. 1993. In this type of conventional art, when paper is fed using a manual paper feed device, the image forming apparatus can not sense the width of the paper. Furthermore, image forming operations are performed regardless of the actual width of the paper fed through the manual paper feed device. Accordingly, if an electrostatic latent image formed on the photosensitive dram is actually smaller than the size of the paper fed to an electrostatic latent image forming device, there is no ostensible problem. However, if the electrostatic latent image formed on the photosensitive dram is actually larger than the size of the paper fed, a portion of the image developed by a developing unit is not able to be fully transferred onto the paper by a transfer unit, and a portion of unused toner remains on the photosensitive dram. This results in unnecessary toner consumption, as well as contamination of the image forming apparatus. As a result, the quality of printing eventually deteriorates.

SUMMARY OF THE INVENTION

It is therefore an object of the present invention to provide an improved image forming apparatus.

It is another object to provide a device and method for minimizing toner consumption in an image forming apparatus.

It is still another object to provide a device and method for preventing toner contamination in an image forming apparatus.

It is yet another object to provide a device and method for minimizing toner consumption and preventing toner contamination in an image forming apparatus by allowing a user to adjust a setting of the image forming apparatus according to the width of a printable medium.

It is still yet another object to provide a device and method for minimizing toner consumption and preventing toner contamination in an image forming apparatus by adjusting left and right margins corresponding to a preset width of a printable medium.

It is a further object to provide a device and method for minimizing toner consumption and preventing toner contamination in an image forming apparatus by preventing printing from occurring in a region outside the preset width of the printable medium.

To accomplish these and other objects, the present invention provides a paper width sensing unit that is adjusted by a user in accordance with the width of a printable medium. A control unit reads a value corresponding to the paper width and generates a control signal representative of the width of the paper. An image forming unit enables formation of an image only within the range corresponding to the width of the paper. A method according to the principles of the present invention includes the steps of detecting a manual paper feeding mode, sensing the width of a printable medium that is pre-set by the user, and forming an image only within a range corresponding to the width of the printable medium.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
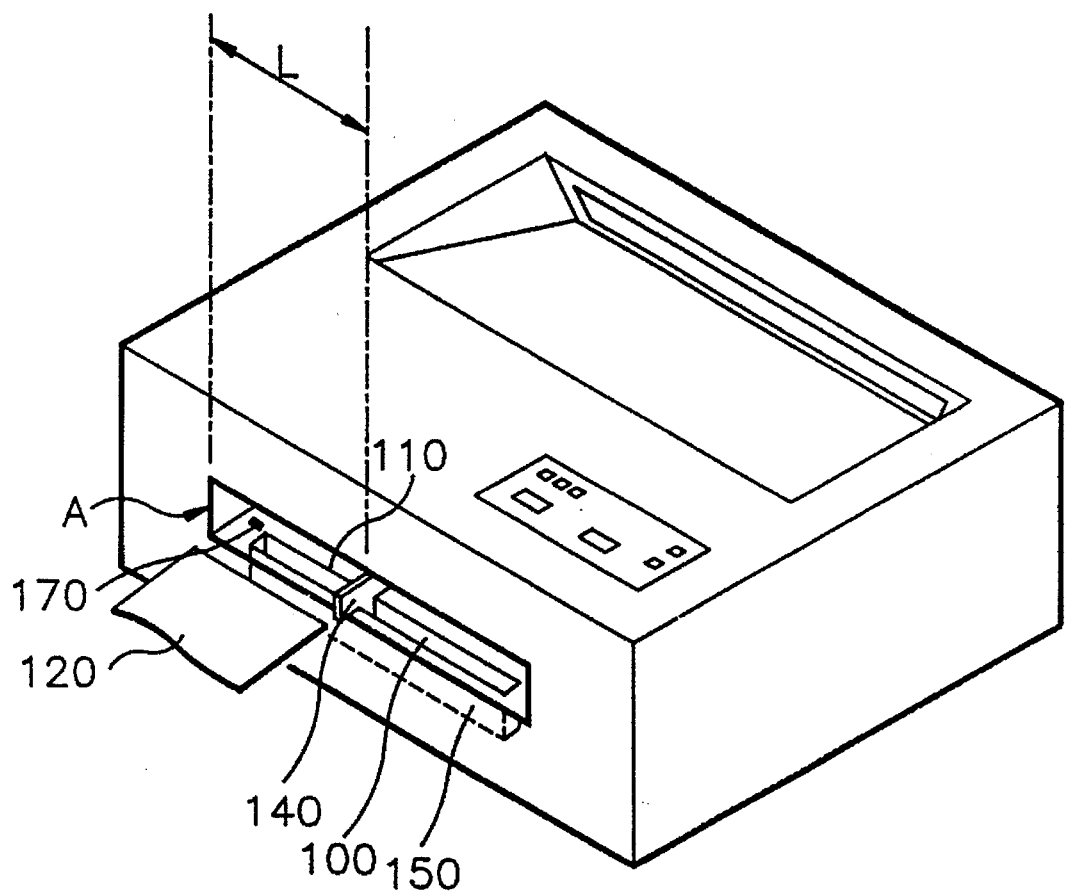
FIG. 1 is a perspective view illustrating a manual paper feed device in an image forming apparatus constructed according to the principles of the present invention.

Turning now to the drawings and referring to FIG. 1, a perspective view illustrating a manual paper feed device in an image forming apparatus constructed according to the principles of the present invention is shown. In FIG. 1, the manual paper feed device includes a manual paper feed guide 110 into which a printable medium 120, such as paper, is fed. A manual paper feed sensor 170 is positioned adjacent to a sidewall A and detects the presence of the printable medium 120 as it is fed into manual paper feed guide 110. A sliding lever 140 moves in the right and left directions along a guide slot 100 in accordance with a width L of the printable medium 120. A variable resistor unit 150 is connected to a lower portion of sliding lever 140 and generates a variable resistance value corresponding to the size of the printable medium 120. The variable resistance value exhibited by variable resistor unit 150 is determined in accordance with the lateral movement of sliding lever 140 along guide slot 100.

While the present invention has been shown with a side wall 'A' for providing a guide when feeding printable medium 120 into the image forming apparatus, the present invention is not intended to be limited to this embodiment, and it will be clear to those skilled in the art that various other methods for guiding the printable medium 120 may be used without departing from the central spirit and scope of the present invention.

Figure 2:
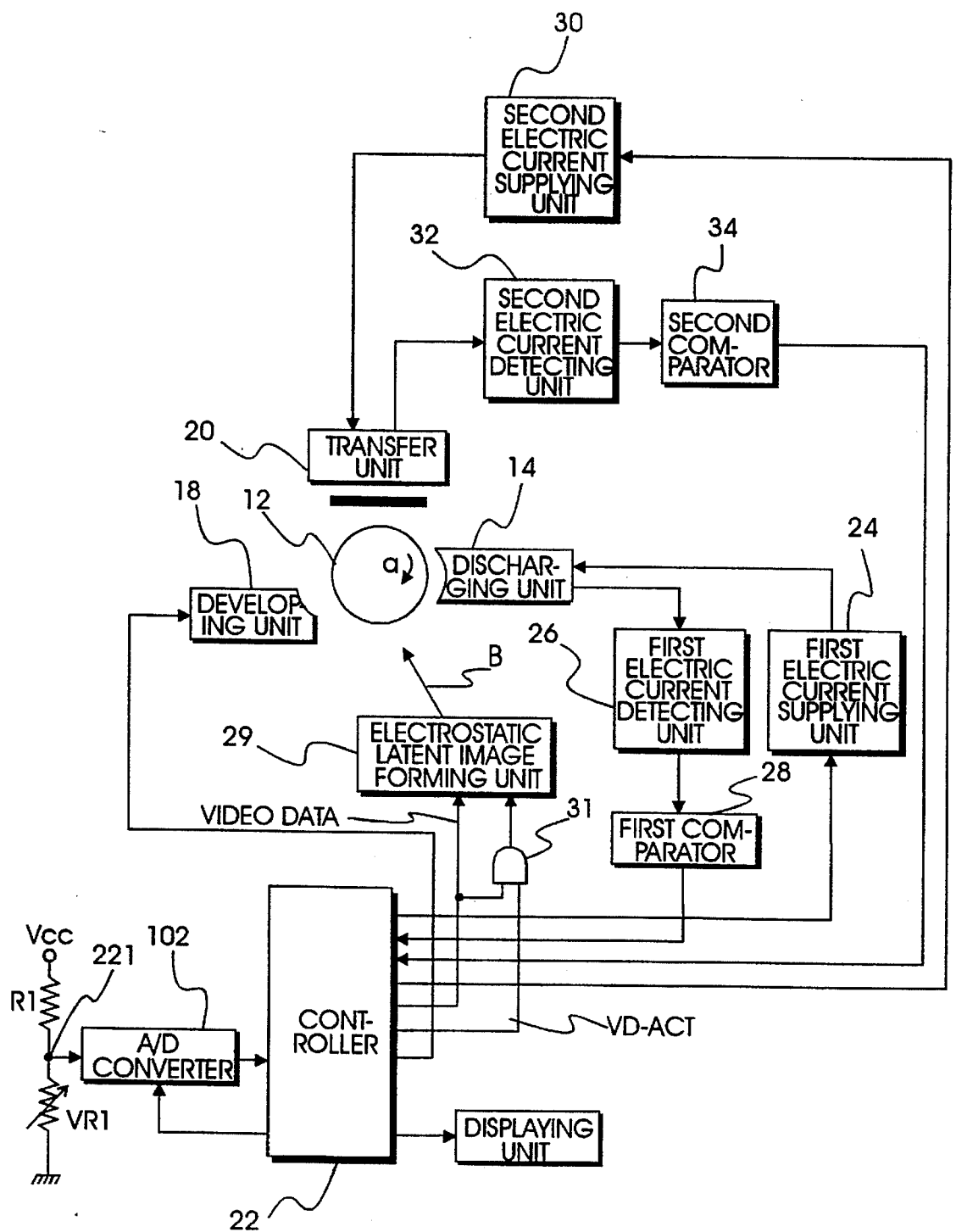
FIG. 2 is a block diagram illustrating an image forming apparatus constructed according to the principles of the present invention.

Referring now to FIG. 2, a diagram illustrating an image forming apparatus constructed according to the principles of the present invention is shown. FIG. 2 includes a variable resistor VR1 which exhibits a resistance corresponding to the width of the printable medium 120 in accordance with movement of sliding lever 140 in the right and left directions along guide slot 100. An analog-to-digital converter 102 digitalizes a signal representative of the width of the printable medium 120 indicated by variable resistor VR1. A load resistor R1 supplies a power supply voltage Vcc to variable resistor VR1, and a controller 22 provides a clock sampling signal for the analog-to-digital conversion operation performed by analog-to-digital converter 102 and generates a control signal corresponding to the width of the printable medium 120 in response to the digitized value received from analog-to-digital converter 102. The control signal is generated so that only an image corresponding to the width of the printable medium 120 is formed.

A description of many of the components in FIG. 2 is provided in U.S. Pat. No. 4,890,125 issued to Egawa on 26 Dec. 1989, which is hereby incorporated by reference. A description of these components will not be provided herein in order not to obscure the present invention.

Figure 3:
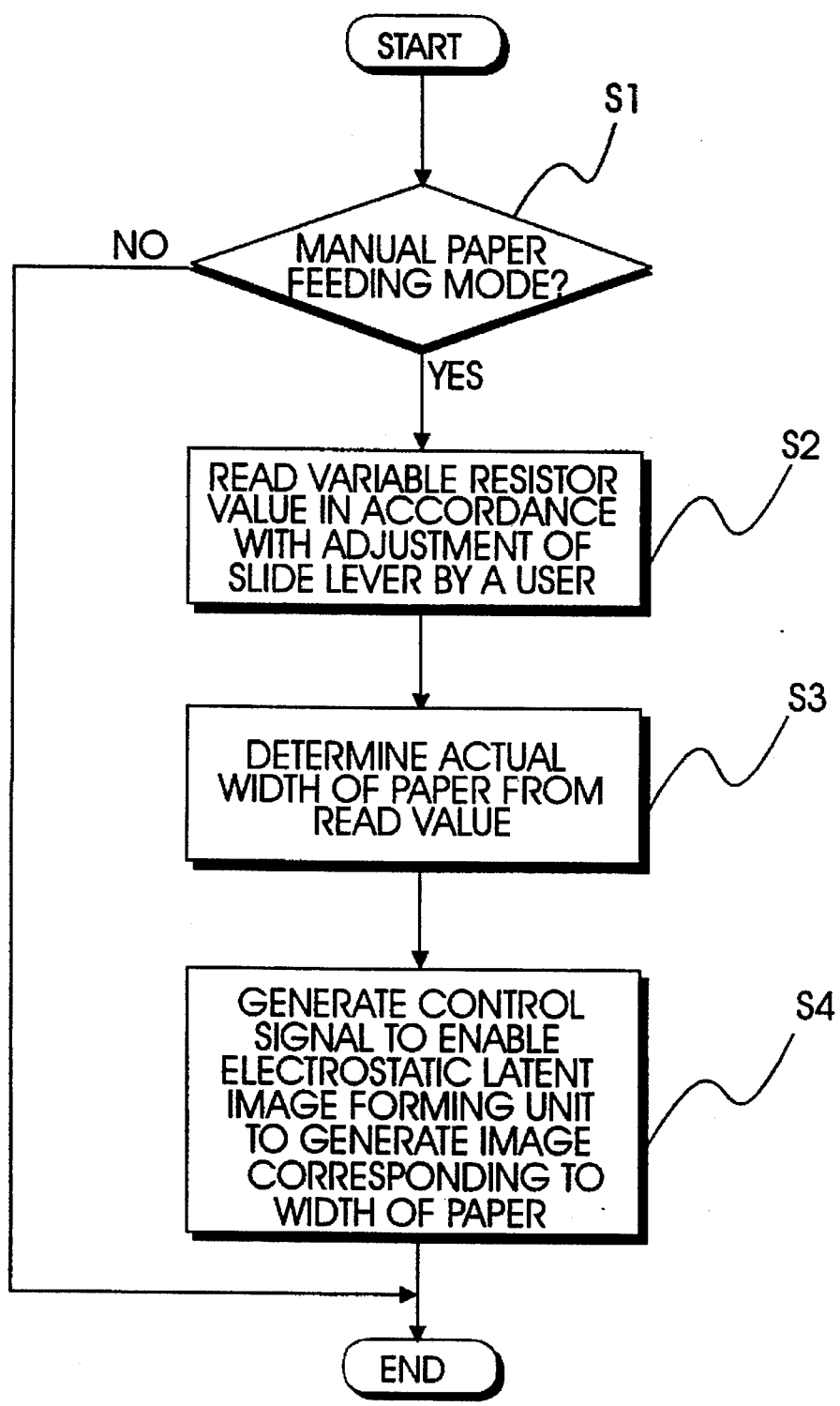
FIG. 3 is a flow chart illustrating a process of operation according to the principles of the present invention.

Referring to FIG. 3, a flow chart illustrating a process of operation according to the principles of the present invention is shown. In FIG. 3, a manual paper feeding mode is detected by sensing whether manual paper feed sensor 170 of manual paper feed guide 110 is turnid on, in a first step S1. When the manual paper feed mode is detected in first step S1, the resistance value exhibited by variable resistor VR1 in accordance with a position of sliding lever 140 that is adjusted by a user is read in a second step S2. In a third step S3, the actual width of printable medium 120 is determined by using the value read in second step S2. Then, in a fourth step S4, a control signal is generated to enable an electrostatic latent image forming unit 29 to form an electrostatic latent image only within the actual width of the printable medium 120 determined in third step S3.

Figure 4A:
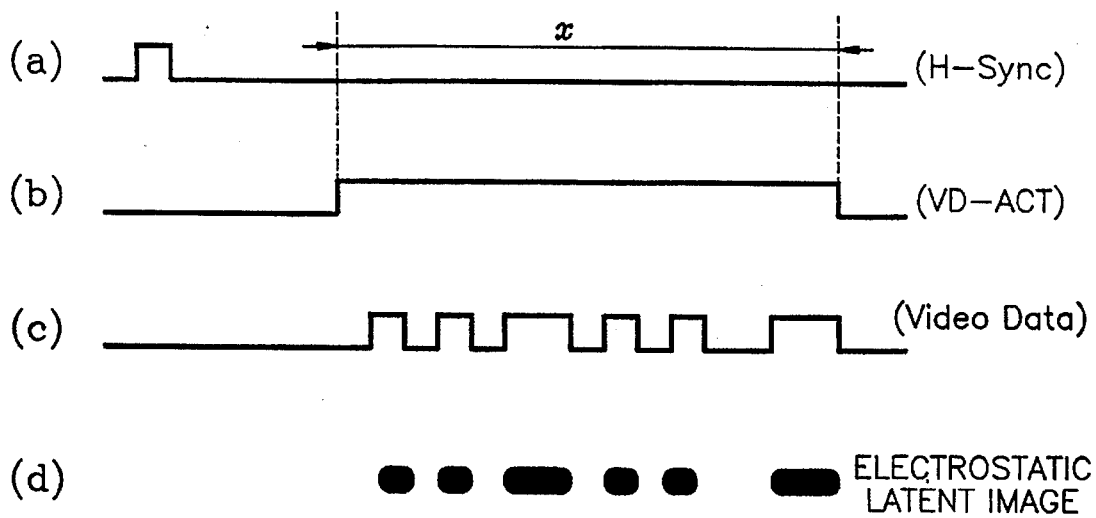
FIG. 4A and FIG. 4B are wave forms illustrating operations of the image forming apparatus constructed according to the principles of the present invention.
Figure 4B:
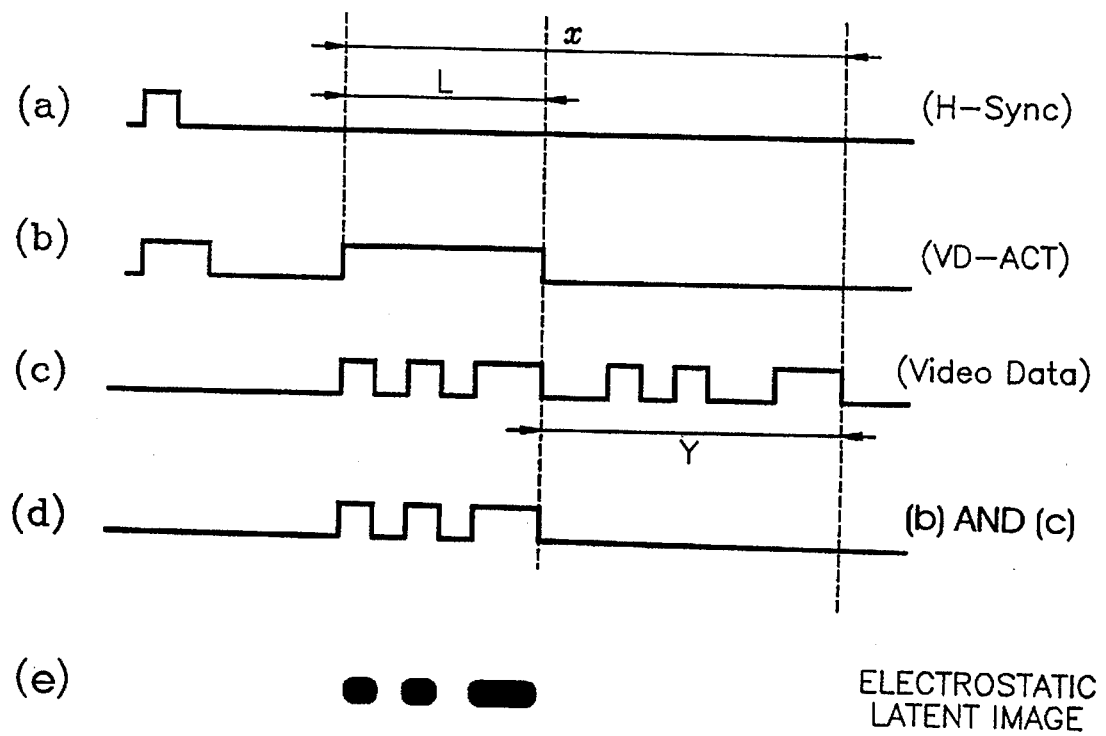

FIGS. 4A and 4B are wave forms illustrating operations of the image forming apparatus constructed according to the principles of the present invention. In particular, FIGS. 4A and 4B illustrate examples of controlling formation of the electrostatic latent image by using the calculated width of the printable medium 120.

A preferred embodiment of the present invention will now be described in detail with reference to FIGS. 1 through 4.

To begin using the manual paper feed device of the present invention, a user first inserts the printable medium 120, typically paper, into manual paper feed guide 110. Manual paper feed sensor 170 installed within the manual paper feed guide 110 detects the printable medium 120 and generates a signal indicating that the printable medium 120 has been inserted into manual paper feed guide 110. Controller 22 senses the manual paper feed mode. Also, while inserting the printable medium 120 into manual paper feed guide 110, the user adjusts the position of sliding lever 140 in accordance with the width of printable medium 120. As a result of the movement of sliding lever 140, a resistance value exhibited by variable resistor VR1 of FIG. 2, is altered.

With the slide loading system of the present invention, variable resistor VR1 exhibits a resistance indicating a maximum width for printable medium 120 when sliding lever 140 is moved to a far right end of guide slot 100, and exhibits a resistance indicating a minimum width for printable medium 120 when sliding lever 140 is moved to a far left end of guide slot 100. A load voltage (i.e., VL=(VR1/VR1+R1)×Vcc, where VR1=resistance value of variable resistor VR1) provided to an input terminal 221 of analog-to-digital converter 102 varies depending upon the resistance of variable resistor VR1. The resistance value read in second step S2 of FIG. 3 is converted into digital data by analog-to-digital converter 102 in accordance with the dock sampling signal generated by controller 22, and is then provided to controller 22. If controller 22 has analog-to-digital conversion means included within its circuitry, the signal provided to input terminal 221 is input directly to controller 22, without the necessity of analog-to-digital converter 102. Controller 22 calculates the actual width of the printable medium 120, in third step S3 of FIG. 3, by using the digitalized output from analog-to-digital converter 102. In order to calculate the actual width of the printable medium 120, data from Table 1 shown below is stored in a memory area (not shown) and the actual width of printable medium 120 corresponding to the digitized value provided from analog-to-digital converter 102 can be read out. In an alternative embodiment of the present invention, the digitalized value representative of the actual width of the printable medium 120 can be calculated using a predetermined expression.

TABLE 1

| varying value of variable resistor (VR1) | R | F |
|---|---|---|
| 0 | R0 | F0 |
| 1 | R1 | F1 |
| 2 | R2 | F2 |
| . | . | . |
| . | . | . |
| 255 | R255 | F255 |

When the table method is used, assuming that the output from analog-to-digital converter 102 of FIG. 2 is 8 bits, the resistance values exhibited by variable resistor VR1 when sliding lever 140 is positioned from the extreme right position to the extreme left position of guide slot 100 are tabled in correspondence with the values 0–255 (i.e., $2^8=256$), as shown in Table 1. A video act signal, VD-ACT, as shown in wave form (b) of FIG. 4A, is generated by selecting table values for a rising time R and a falling time F (that is, one of the values 0–255) in accordance with the value exhibited by variable resistor VR1. These time values are varied in accordance with printing speed, paper width and the type of printer being employed. It is also possible to adjust the preset values from 50 to 250, without confining the video act signal VD-ACT within the range of values 0–255. Here, since the printable medium 120 is inserted into manual paper feed guide 110 such that the starting position of the printable medium 120 for a printing operation is always the same, rising time R0=R1=Rn, and use of data from Table 1 may not be required.

In the alternative embodiment of the present invention where the actual width of the printable medium 120 is calculated using a predetermined expression, it is assumed that sliding lever 140 is positioned within a predetermined range (e.g., 50–216 mm) to indicate the falling times F shown in Table 1. Then, when the digitized value representative of the resistance of variable resistor VR1 is expressed in 8 bits, the voltage provided by variable resistor VR1 varies from 20 to 200 volts. In such a case, the failing time F of the video act signal VD-ACT can be generated according to the expression (1) shown below.

$$F(VD\text{-}ACT) = 50 + [V(ADC) - 20] \times \frac{216 - 50}{200 - 20} = 50 + [V(ADC) - 20] \times \frac{83}{90} \quad (1)$$

The result from expression (1), after being adjusted in controller 22, is used to enable formation of the electrostatic latent image on photosensitive drum 12 under the control of electrostatic latent image forming unit 29. FIGS. 4A and 4B are timing diagrams illustrating control of the electrostatic latent image formation by using the value representative of the width of the printable medium 120. In particular, FIG. 4A shows a general example in which the electrostatic latent image is formed without regards to the width of the printable medium 120. That is, FIG. 4A corresponds to the case where the manual paper feed device uses standard paper in an image forming apparatus used in the conventional art or in the present invention. An H-SYNC signal represented as (a) in FIG. 4A is a signal indicating the beginning of a new line. The H-SYNC signal is always generated at a constant point in a horizontal direction. The video act signal VD-ACT represented as (b) in FIG. 4A is the control signal that enables the electrostatic latent image forming unit 29 to form the electrostatic latent image. Electrostatic latent image forming unit 29 operates only when the video act signal VD-ACT represents a binary state of '1'. That is, if the VD-ACT signal represents a binary state of '0', even if video data represented as (c) in FIG. 4A is input, electrostatic latent image forming unit 29 does not enable formation of the electrostatic image latent. The electrostatic latent image is represented in black as shown in (d) of FIG. 4A.

FIG. 4B exemplifies a situation where the width of the printable medium 120 is considered during the image forming process. Referring to FIGS. 4A and 4B, if 'x' represents the length of a time interval corresponding to printable mediums having a standard width (e.g., A4 paper), the video data represented by (c) in FIG. 4A is formed as an electrostatic latent image since the video act signal VD-ACT represented by (b) in FIG. 4A is in a binary state of '1' within the range corresponding to the size of A4 paper.

When the actual width of a printable medium 120 is determined, controller 22 maintains the video act signal VD-ACT represented by (b) in FIG. 4B in a binary state of '1' only during the period of time corresponding to the width L (see (a) in FIG. 4B) of the printable medium 120. That is, video act signal VD-ACT has a pulse width corresponding to the width of the printable medium 120. Thus, the video data represented by (c) in FIG. 4B corresponding to an interval 'Y' is ignored by electrostatic latent image forming unit 29 and is not used to form an electrostatic latent image. As a result, the electrostatic latent image is formed as shown in (e) of FIG. 4B. In the present invention, the electrostatic latent image shown in (e) of FIG. 4B is derived by logically ANDing the video act signal VD-ACT shown in (b) of FIG. 4B with the video data shown in (c) of FIG. 4B via AND gate 31 shown in FIG. 2. The result of this logical AND operation is shown in (d) of FIG. 4B, and is used to control operation of electrostatic latent image forming unit 29. That is, only when the video act signal VD-ACT and the video data signal both exhibit a binary state of '1', is the electrostatic latent image formed.

As described above, when manually feeding paper in an image forming apparatus, an electrostatic latent image forming unit can be controlled with information indicative of the width of the paper, and the electrostatic latent image is not formed where no paper exists. Consequently, unnecessary toner consumption and toner contamination in the image forming apparatus can be prevented.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A device for saving toner and preventing toner contamination in an image forming apparatus, said device comprising:

width sensing means for generating a width sensing signal representative of a width of a printable medium being manually fed into said image forming apparatus, said width sensing means being adjustable by a user to indicate said width of said printable medium;

control means for determining said width of said printable medium in dependence upon said width sensing signal, and generating a control signal representative of said width of said printable medium; and image forming means for enabling formation of an image upon an outer surface of a photosensitive member in dependence upon said control signal, said image having a size corresponding to said width of said printable medium.

2. The device as claimed in claim 1, wherein said width sensing means comprises a variable resistor and a sliding lever connected to said variable resistor, said variable resistor exhibiting an electrical resistance in dependence upon a physical position of said sliding lever that is adjustable by the user, said physical position of said sliding lever being indicative of said width of said printable medium.

3. The device as claimed in claim 2, wherein said physical position of said sliding lever is adjusted by the user moving said sliding lever laterally along a guide slot formed within an entry portion of said image forming apparatus where said printable medium is manually fed into said image forming apparatus.

4. The device as claimed in claim 1, wherein said image forming means is comprised of:

means for generating a logical result by logically ANDing said control signal and a video data signal representative of said image; and an electrostatic latent image forming unit for forming said image upon said outer surface of said photosensitive member when said logical result exhibits a first binary state.

5. A method for saving toner and preventing toner contamination in an image forming apparatus, said method comprising the steps of:

detecting a width of a printable medium being manually fed into said image forming apparatus, said width of said printable medium being detected in dependence upon an adjustment performed upon said image forming apparatus by a user to indicate said width of said printable medium;

generating a width sensing signal representative of said width of said printable medium detected in said detecting step; and forming an image upon an outer surface of a photosensitive member in dependence upon said width sensing signal, said image having a size corresponding to said width of said printable medium.

6. The method as claimed in claim 5, wherein said step of forming said image further comprises the steps of:

generating a video action signal in response to said width sensing signal, said video action signal having a pulse width corresponding to said width of said printable medium; and logically ANDing said video action signal and a video data signal representative of said image to generate a logical result; and providing said logical result to an electrostatic latent image forming unit to form said image upon said outer surface of said photosensitive drum.

7. The method as claimed in claim 6, wherein said pulse width of said video action signal is determined by calculating a falling time for an electrical pulse of said video action signal according to a predetermined expression.

8. The method as claimed in claim 6, wherein said pulse width of said video action signal is determined by locating a falling time for an electrical pulse of said video action signal within a predetermined table of data stored within said image forming apparatus.

9. The method as claimed in claim 5, wherein said adjustment performed upon said image forming apparatus comprises a step of the user moving a sliding lever laterally along a guide slot formed within an entry portion of said image forming apparatus where said printable medium is manually fed into said image forming apparatus to indicate said width of said printable medium.

10. The method as claimed in claim 6, wherein said adjustment performed upon said image forming apparatus comprises a step of the user moving a sliding lever laterally along a guide slot formed within an entry portion of said image forming apparatus where said printable medium is manually fed into said image forming apparatus to indicate said width of said printable medium.

11. A device for saving toner and preventing toner contamination in an image forming apparatus, said device comprising:

width sensing means for generating a width sensing signal representative of a width of a printable medium being manually fed into said image forming apparatus, said width sensing means comprising a variable resistor and a sliding lever connected to said variable resistor, said variable resistor exhibiting an electrical resistance in dependence upon a physical position of said sliding lever that is adjustable by a user, said physical position of said sliding lever being indicative of said width of said printable medium;

control means for determining said width of said printable medium in dependence upon said width sensing signal, and generating a control signal having a pulse width corresponding to said width of said printable medium; and image forming means for enabling formation of an image upon an outer surface of a photosensitive member in dependence upon said pulse width of said control signal, said image having a size corresponding to said width of said printable medium, said image forming means comprising means for generating a logical result by logically combining said control signal and a video data signal representative of said image and forming said image upon said outer surface of said photosensitive drum when said logical result exhibits a first binary state.

12. The device as claimed in claim 11, wherein said physical position of said sliding lever is adjusted by the user moving said sliding lever laterally along a guide slot formed within an entry portion of said image forming apparatus where said printable medium is manually fed into said image forming apparatus.

13. The device as claimed in claim 11, wherein said means for generating said logical result comprises an AND gate and said first binary state is a logic '1'.

14. The device as claimed in claim 11, wherein said control means determines said pulse width of said control signal by calculating a falling time for an electrical pulse of said control signal according to a predetermined expression.

15. The device as claimed in claim 11, wherein said control means determines said pulse width of said control signal by locating a failing time for an electrical pulse of said video action signal within a predetermined table of data stored within said image forming apparatus.

16. The device as claimed in claim 12, wherein said control means determines said pulse width of said control signal by calculating a failing time for an electrical pulse of said control signal according to a predetermined expression.

17. The device as claimed in claim 12, wherein said control means determines said pulse width of said control signal by locating a falling time for an electrical pulse of said video action signal within a predetermined table of data stored within said image forming apparatus.

\* \* \* \* \*